(12) United States Patent
Bryant et al.

(10) Patent No.: US 9,746,844 B2
(45) Date of Patent: Aug. 29, 2017

(54) METHODS AND APPARATUS FOR A FILE SYSTEM ON A PROGRAMMABLE LOGIC CONTROLLER

(75) Inventors: William Keith Bryant, Johnson City, TN (US); Lothar Trapp, Feucht (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 870 days.

(21) Appl. No.: 13/500,605

(22) PCT Filed: Apr. 1, 2011

(86) PCT No.: PCT/US2011/030907
§ 371 (c)(1),
(2), (4) Date: Apr. 5, 2012

(87) PCT Pub. No.: WO2012/134491
PCT Pub. Date: Oct. 4, 2012

(65) Prior Publication Data
US 2012/0290539 A1    Nov. 15, 2012

(51) Int. Cl.
*G06F 17/30* (2006.01)
*G05B 19/05* (2006.01)

(52) U.S. Cl.
CPC ....... *G05B 19/05* (2013.01); *G06F 17/30073* (2013.01); *G06F 17/30289* (2013.01); *G06F 17/30575* (2013.01); *G06F 17/30893* (2013.01)

(58) Field of Classification Search
CPC ......... G06F 17/30073; G06F 17/30289; G06F 17/30575

USPC .......................................................... 707/661
See application file for complete search history.

(56) References Cited

U.S. PATENT DOCUMENTS

| | | | | |
|---|---|---|---|---|
| 4,366,350 A | * | 12/1982 | Lee | H04M 3/241 379/18 |
| 5,493,571 A | * | 2/1996 | Engdahl | H04L 7/041 370/514 |
| 6,697,311 B1 | * | 2/2004 | Kim | G11B 20/10009 369/47.19 |

(Continued)

FOREIGN PATENT DOCUMENTS

| | | |
|---|---|---|
| CN | 1993659 A | 7/2007 |
| KR | 100183975 B1 | 4/1999 |

OTHER PUBLICATIONS

PCT International Search Report for Application No. PCT/US11/30907, dated Jun. 8, 2011, 8 pages.

*Primary Examiner* — Mark E Hershley

(57) ABSTRACT

Methods, apparatus, and systems are provided for a web browser accessible data file system on a programmable logic controller (PLC). The invention includes a PLC which includes a controller module; a file system module coupled to the controller module and adapted to persistently store archive data files; a memory module that stores binary data coupled to the controller module; and a user program module that stores instructions adapted to be executed by the controller module. The instructions may include creating an archive file in a user application format in the file system module; storing binary data in the memory module; converting the binary data to the user application format of the archive file; and storing the converted binary data as an entry in the archive file in the file system module. Numerous additional aspects are disclosed.

14 Claims, 4 Drawing Sheets

(56) References Cited

U.S. PATENT DOCUMENTS

| | | | |
|---|---|---|---|
| 7,685,596 B1* | 3/2010 | Webb et al. | 717/177 |
| 2002/0029228 A1* | 3/2002 | Rodriguez | G06F 17/30076 |
| 2002/0147734 A1 | 10/2002 | Shoup et al. | |
| 2003/0046380 A1* | 3/2003 | Steger | H04L 43/14 |
| | | | 709/223 |
| 2003/0074489 A1* | 4/2003 | Steger | G01D 9/005 |
| | | | 710/1 |
| 2003/0204560 A1* | 10/2003 | Chen et al. | 709/203 |
| 2005/0007826 A1 | 1/2005 | Boggs et al. | |
| 2006/0010230 A1 | 1/2006 | Karklins et al. | |
| 2006/0190106 A1 | 8/2006 | Kay et al. | |
| 2007/0078988 A1* | 4/2007 | Miloushev et al. | 709/227 |
| 2007/0154009 A1* | 7/2007 | Cameron | H04M 3/02 |
| | | | 379/373.02 |
| 2007/0282951 A1* | 12/2007 | Selimis et al. | 709/205 |
| 2008/0270528 A1* | 10/2008 | Girardeau | H04L 1/0007 |
| | | | 709/203 |
| 2008/0294915 A1 | 11/2008 | Juillerat et al. | |
| 2009/0037478 A1 | 2/2009 | Theobald | |
| 2010/0114336 A1 | 5/2010 | Konieczny et al. | |
| 2011/0296038 A1* | 12/2011 | Mandre | G06F 17/30899 |
| | | | 709/228 |
| 2012/0160918 A1* | 6/2012 | Negro | 235/455 |

\* cited by examiner

METHODS AND APPARATUS FOR A FILE SYSTEM ON A PROGRAMMABLE LOGIC CONTROLLER

CROSS REFERENCE TO RELATED APPLICATION

This patent document claims priority under 35 U.S.C. §119 and all other benefits permitted by law from PCT Patent App. Serial No. PCT/US2011/030907, titled "METHODS AND APPARATUS FOR A FILE SYSTEM ON A PROGRAMMABLE LOGIC CONTROLLER," filed Apr. 1, 2011, the content of which is hereby incorporated by reference in its entirety to the extent permitted by law.

FIELD OF THE INVENTION

The present invention generally relates to programmable logic controllers, and more particularly to a file system for manipulating and accessing data on programmable logic controllers.

BACKGROUND OF THE INVENTION

Programmable logic controllers (PLCs) receive and store data within their local memory. However, the data is typically raw binary data originating as electrical signals and/or process data from the application controlled by the PLC. Typically, this data requires a proprietary external application that is specifically aware of the PLC to access and interpret/convert the stored data. Thus, for a user application to retrieve data from a PLC, the PLC manufacturer must provide an additional mechanism that a user must utilize in order to access process related data. What are needed are methods and apparatus that allow access to PLC stored data without the need for additional mechanisms.

SUMMARY OF THE INVENTION

The embodiments of the present invention generally relate to methods and apparatus for implementing a web browser accessible file system on a programmable logic controller.

In some embodiments, the present invention provides a method of accessing, converting, storing, and making accessible binary process data in a standardized format. This format can then be used by a web browser to represent process data in an inherently standardized manner.

In some other embodiments, the present invention provides a programmable logic controller (PLC). The PLC includes a controller module; a file system module coupled to the controller module and adapted to persistently store archive data files; a memory module that stores binary data coupled to the controller module; and a user program module that stores instructions adapted to be executed by the controller module. The instructions may include creating an archive file in a user application format in the file system module; storing binary data in the memory module; converting the binary data to the user application format of the archive file; and storing the converted binary data as an entry in the archive file in the file system module.

In yet other embodiments, the present invention provides a method for a programmable logic controller. The method includes creating an archive file in a user application format in a persistent file system module of a programmable logic controller; storing binary data in a memory module of the programmable logic controller; converting the binary data to the user application format of the archive file; and storing the converted binary data as an entry in the archive file in the persistent file system module. The method may further include receiving a request for a listing of archive files from a browser application and presenting a web page listing archive files in response to the request for a listing of archive files.

In still yet other embodiments, the present invention provides a web page display that includes a listing of archive files stored in a persistent file system module of a programmable logic controller wherein the archive files are generated by converting binary data stored in a memory module of the programmable logic controller; and controls adapted to allow a user to open the listed archive files directly into in a user application.

These and other features and aspects of the present invention will become more fully apparent from the following detailed description of exemplary embodiments, the appended claims and the accompanying drawings.

BRIEF DESCRIPTION OF THE DRAWINGS

An artisan of ordinary skill will understand that the drawings, described below, are for illustration purposes only. The drawings are not intended to limit the scope of the present teachings in any way.

DETAILED DESCRIPTION

For the purpose of interpreting this specification, whenever appropriate, terms used in the singular will also include the plural and vice versa. The use of "or" is intended to mean "and/or" unless stated otherwise. The use of "a" herein is intended to mean "one or more" unless stated otherwise or where the use of "one or more" is clearly inappropriate. The use of "comprise," "comprises," "comprising," "include," "includes," and "including" are interchangeable and not intended to be limiting. Furthermore, where the description of one or more embodiments uses the term "comprising," those of ordinary skill in the art would understand that, in some specific instances, the embodiment or embodiments can be alternatively described using the language "consisting essentially of" and/or "consisting of."

While the present teachings are described in conjunction with various embodiments, it is not intended that the present teachings be limited to such embodiments. On the contrary, the present teachings encompass various alternatives, modifications, and equivalents, as will be appreciated by those of ordinary skill in the art.

The present invention utilizes a web browser application to access data resident upon an internal file system of a programmable logic controller (PLC) in such a way that the browser can natively comprehend the format of the stored data. Conventional PLCs store data in a raw binary format in memory and typically require custom mechanisms to access the data in the PLC. In contrast, using any standard web browser application, the system of the present invention allows a host computer (e.g., a personal computer and Internet browser) to access data files within the memory of a PLC. The files are stored in a file system such that a user utilizing an internet protocol (IP) address of the PLC can view a directory listing of the stored archiving files displayed in the web browser application. In addition, the data archive files themselves are stored within the PLC in a standard file format, such as the Comma Separated Values (CSV) format, such that upon accessing a data file via the web browser accessible file system, the host PC may associate the file with an installed PC application (e.g., a spreadsheet program such as, for example, Microsoft Excel provided by Microsoft Corporation). Thus, using the system of the present invention, a user may browse to the PLC and read out data within the PLC's memory directly into an application such as, for example, a spreadsheet program, a word processor program, a database application, or the like.

Figure 1:
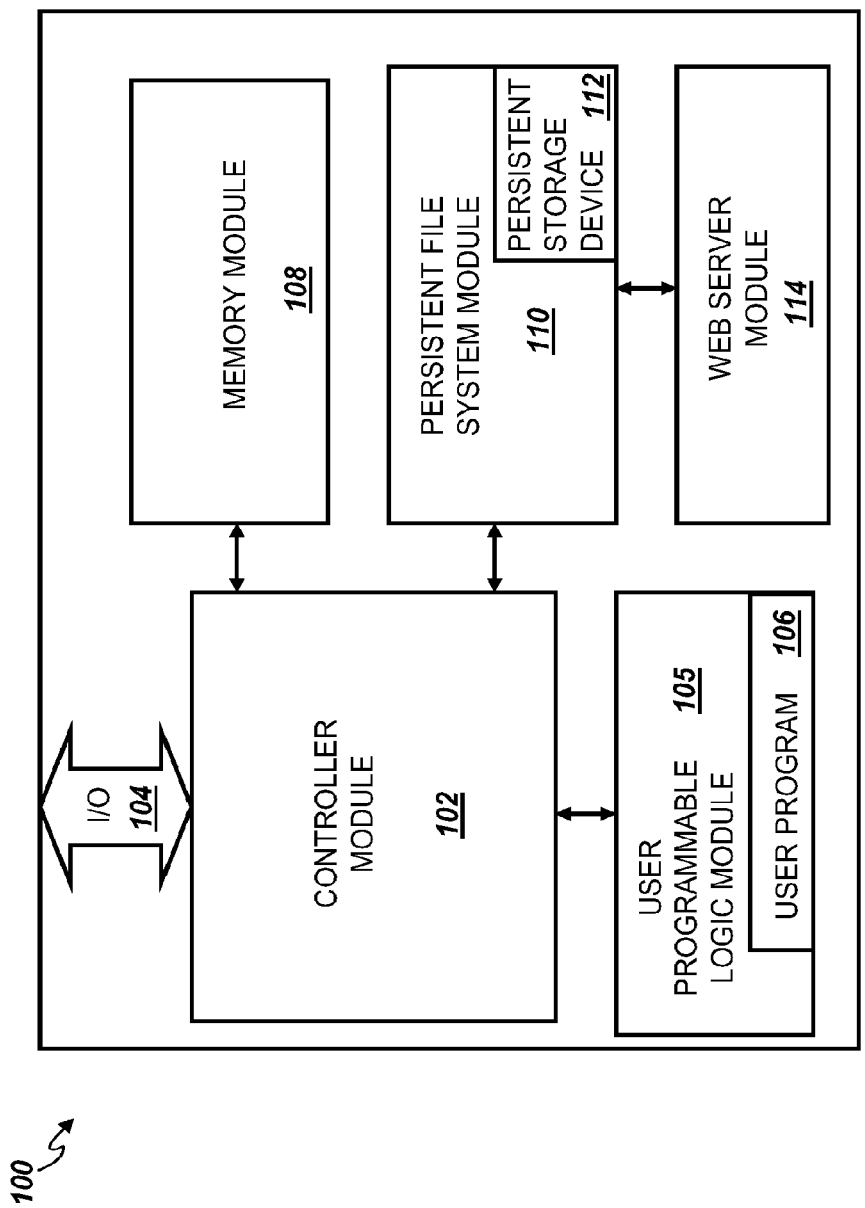
FIG. 1 is a block diagram of a programmable logic controller according to some embodiments of the present invention.
Figure 4:
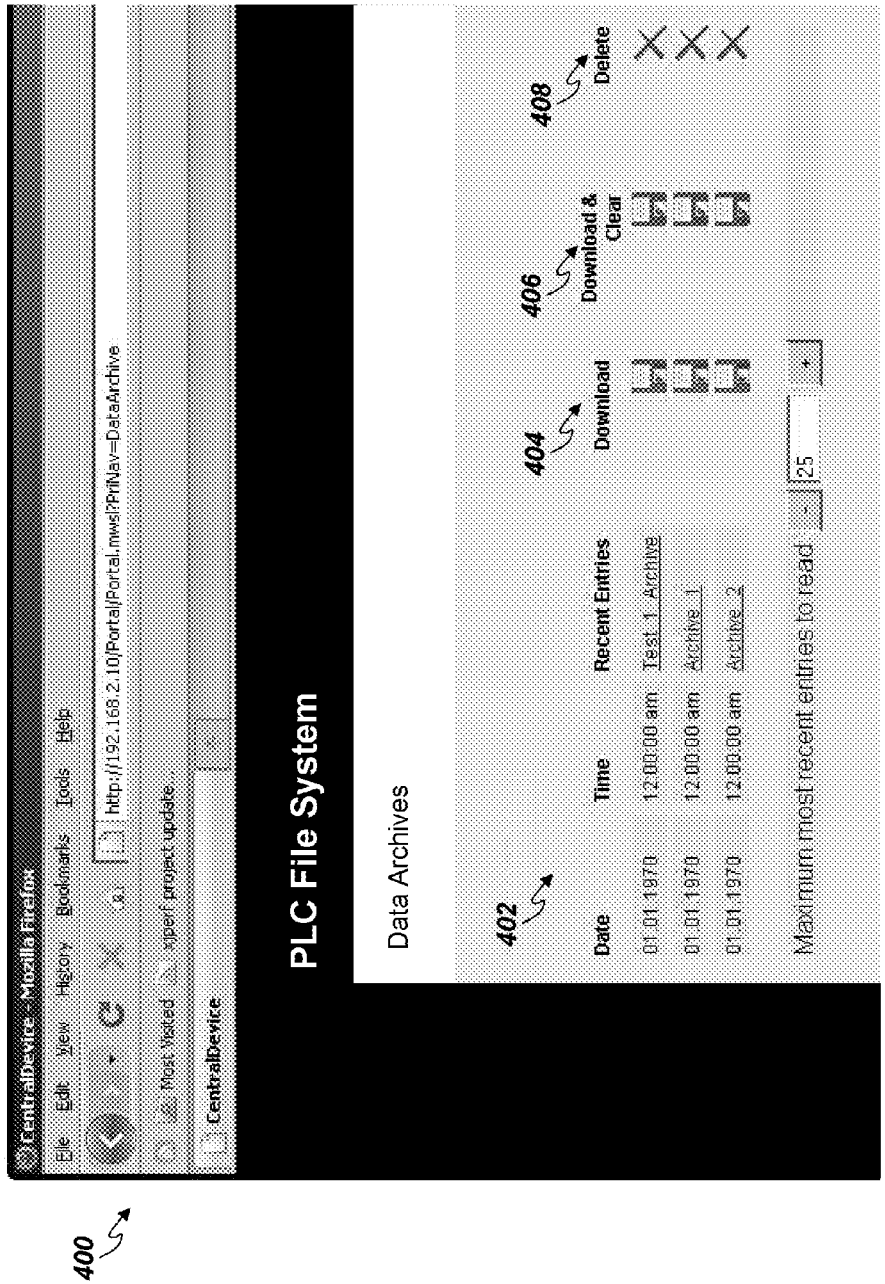
FIG. 4 is a screen capture image of an example embodiment of a web page adapted to provide access to the data archive file system according to some embodiments of the present invention.

Turning to FIG. 1, an example structure of a PLC 100 according to embodiments of the present invention is provided. The PLC 100 includes a controller module 102 which is accessible by a host computer (not shown) and other devices such as sensors (not shown) via network (e.g., Ethernet 10×) and I/O channels 104. Coupled to the controller module 102 is user programmable logic module 105 which is used to implement any desired user program 106 using well known methods. In operation, the user program 106 is loaded into the PLC 100 and directs the controller module 102 to collect and store data into a memory module 108. In other words, the controller module 102 is adapted to be able to access a memory module 108 which may be used to store binary data that is generated, captured, or received by the controller module 102 under the direction of the user program 106. The controller module 102 is also adapted to convert binary data in the memory module 108 to data archive files that are stored in a persistent file system module 110. The persistent file system module 110 is thus also coupled to the controller module 102. The persistent file system module 110 includes logic to implement file access and management functions (e.g., read, write, delete, list, etc.) for data archive files stored in a persistent storage device 112. The persistent storage device 112 may be implemented using any appropriate non-volatile memory device. The PLC 100 of the present invention also includes a web server module 114 coupled to the persistent file system module 110. The web server module 114 generates an archive file system access web page in response to a browser on a host computer accessing an IP address and specific data archive web page stored within persistent file system module 110. The generated web page provides a capability which allows a user to access the files managed by the file system module 110 and stored in the persistent storage device 112 as data archive files. FIG. 4, described below, illustrates an example instantiation of a file system access web page that may be provided by the web server module 114.

Figure 2:
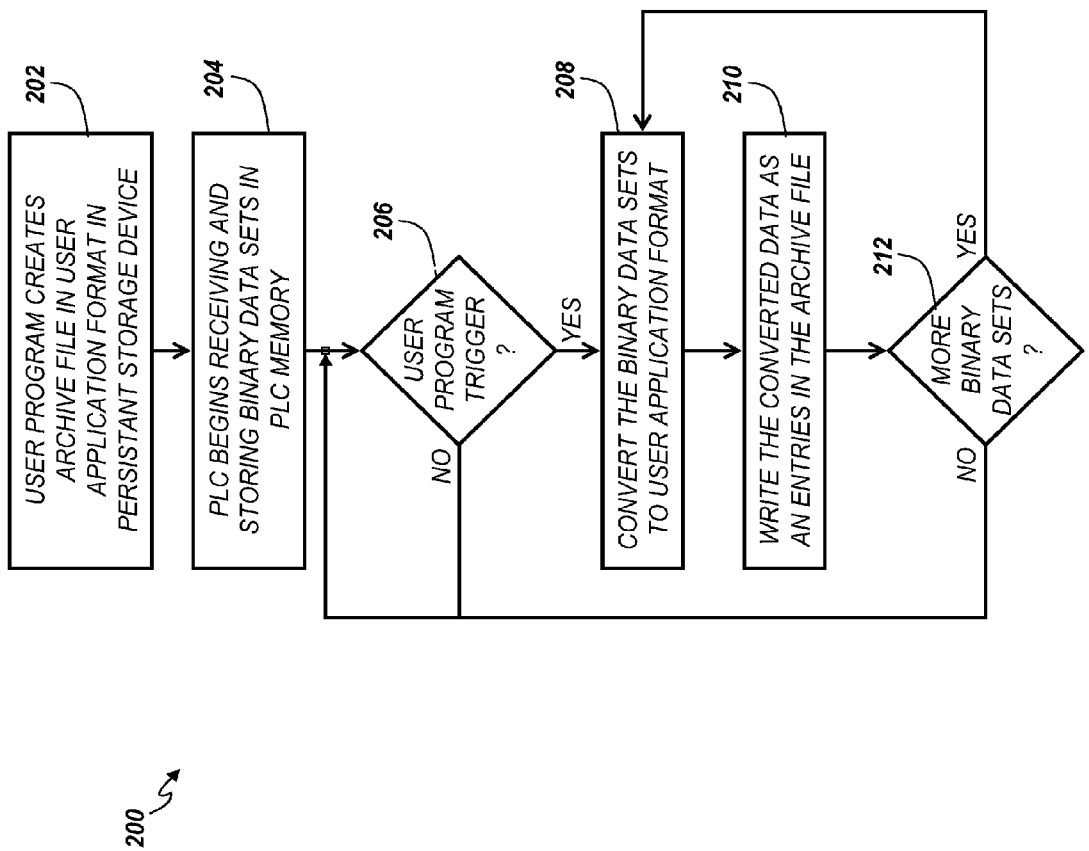
FIG. 2 is a flow chart depicting an example method of operating a programmable logic controller according to some embodiments of the present invention.

Turning to FIG. 2, a flowchart depicting an example method 200 according to embodiments of the present invention is provided. In Step 202, the PLC user program initiates creation of a data archive file in a standard user application format such as, for example, the comma separate value (CSV) MIME type format. Other formats may be used as well. For example, the file may be in ASCII text, HTML, or XML format. More generally, a data archive file is a structured set of data records which are stored in a sequential or circular file. The format used is inherently understood by standard web browsers. Any such format may be used. This enables the browser application to automatically use a user application previously associated with the file type.

In Step 204, the PLC begins to receive and store raw binary data in the memory of the PLC. The binary data may be stored as data sets where each data set represents a meaningful value to the user. For example, a data set may include eight bytes of binary data that represents a temperature, date, speed, pressure, etc. As long as the user program continues to run, the PLC will continue to receive and store raw binary data into the memory of the PLC. In other words, the receipt and storage of the binary data may continue independently, asynchronously, and in parallel with the remaining steps of this method and any other processes of the present invention.

In Step 206, the PLC begins checking to determine if the user program resident in the PLC has triggered a transfer operation. The transfer operation includes converting and writing the binary data to the persistent file system as will be described below. The trigger condition may be any user defined condition that is used to start the transfer steps. For example, the trigger condition may be that a fixed amount of binary data has been received by the PLC; the memory 108 has filled; a defined amount of time has elapsed; or a particular value, pattern, or other condition in the binary data has been recognized or occurred. In other words, any practicable trigger condition may be used to initiate the transfer. If the user program trigger condition has been satisfied (i.e., the trigger has been tripped) then flow proceeds to Step 208. Otherwise the system continues to wait for the trigger condition to occur in Step 206. In either case, the system continues to store binary data in the PLC memory.

In Step 208, the PLC converts the binary data sets into the standard user application format and continues to do so each time data is stored in the PLC memory. In Step 210, the PLC stores the converted data set as an entry in the data archive file. These steps repeats each time the user program wishes to capture an instance of the binary process data. Note that as part of the conversion of the binary data sets (Step 208), during the write operation of the converted data, and/or during the creation of the archive file (Step 202), information describing the data archive (e.g., a name, file size, file format, etc.) may be stored in the data archive file. In Step 212, it is determined if there are more binary data sets to convert and store. If so, flow loops back to Step 208, otherwise program flow loops back to Step 206 to wait for additional binary data.

Note that the above-described steps and the steps in the example methods described below are merely exemplary. Many additional or alternative steps may be implemented. Likewise, many of the steps may include sub-steps or be combined into compound steps. Finally, the order of the steps may be altered into any practicable sequence or parallel arrangement.

Figure 3:
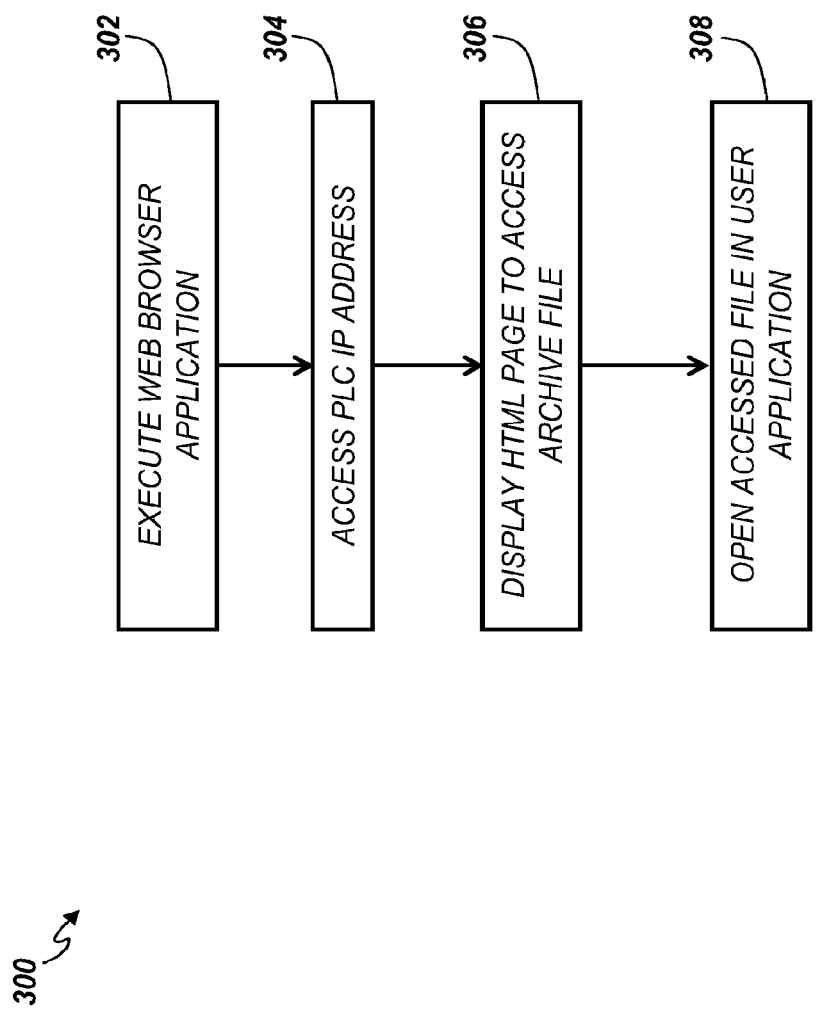
FIG. 3 is a flow chart depicting an example method of accessing archived data files on a programmable logic controller according to some embodiments of the present invention.

Turning to FIG. 3, an example method of accessing archived data files stored in the persistent file system is described. In Step 302, a user runs a standard web browser application. In Step 304, the web browser is directed by the user to access an IP address of the PLC. In response, in Step 306, the web server module 114 accesses the persistent file system module 110 and presents the browser with an HTML web page listing the data archive files stored in the persistent storage device 112 of the PLC 100. In Step 308, the user may import a data archive file into an application program by selecting the desired file from the HTML web page listing provided in Step 306.

A more detailed and specific example involving the methods of the present invention is described below. It will be understood that the example is intended merely to be illustrative and should not be construed as limiting in any manner. In an application of the present invention, a user may wish to archive two variables, (1) TEMPERATURE and (2) PRESSURE in every cycle in a cyclically executed code block. The archive data record is defined for example, as two data values represented in floating point notation. The data to log are sampled by the user program 106, converted to strings and moved sequentially to the persistent file system module 110 and into the archive data file. This process results in a record of information including date, time, temperature, and pressure data. The format for the converted data is defined to be CSV mime type. In this example, the conversion of the binary data and storage of the converted data is performed whenever the temperature exceeds a user specified limit. This is an example of the user program trigger for Step 206 of FIG. 2. The result is a CSV file which contains pairs of the values for TEMPERATURE and PRESSURE which can easily be displayed in Excel as curves. In other words, the archive file can be transferred to a host PC and the values of the variables can be displayed as graphs in a program such as Microsoft Excel.

Turning now to FIG. 4, an example embodiment of a data archive file access web page 400 is provided. The data archive access page 400 is responsible for displaying a listing 402 of all available data archive files with the date and time of the last update. By activating the respective icon/graphical user interface control, the user may view a configurable number of archive files, download an archive 404, download and clear an archive 406, and/or delete an archive 408. The download operation 404 reads all existing records from the data archive file at the point in time that the request was received. Note that new records or entries may be added to an archive while the download is in progress. The download and clear operation 406 may also read all existing records from the archive at the point in time that the request was received with new records being added to the archive while the download is in progress. Once the download has been successfully completed, all downloaded records may be cleared or denoted as being cleared. Records may be cleared once the download operation has successfully completed.

When the selection is made to open a data archive file, the user's browser displays the archive data using the registered application associated with the archive data file type. For example, the default application for Internet Explorer 6.0 and Firefox 3.0.11 executing on Windows XP accessing a CSV MIME type file is Microsoft Excel.

Embodiments of the teachings of the present invention have been described in an illustrative manner. It is to be understood that the terminology, which has been used, is intended to be in the nature of words of description rather than of limitation. Many modifications and variations of the embodiments are possible in light of the above teachings. Therefore, within the scope of the appended claims, the embodiments can be practiced other than as specifically described.

The invention claimed is:

1. A programmable logic controller comprising:
a controller module of the programmable logic controller;
a file system module coupled to the controller module and adapted to persistently store archive data files in a persistent storage device within the programmable logic controller;
a memory module that stores binary data coupled to the controller module;
a web server module coupled to the file system module; and
a user program module that stores instructions adapted to be executed by the controller module, the instructions including:
collecting and storing a binary data in the memory module;
creating an archive file in a user application format in the file system module;
converting the binary data stored in the memory module to the user application format of the archive file when a trigger condition for triggering the converting has been satisfied, the trigger condition being a user defined condition for initiating the converting, wherein the collecting and storing of binary data in the memory module continues while converting previously collected and stored binary data; and
storing converted binary data as an entry in the archive file in the file system module; and
presenting an archive file system access web page, generated by the web server module, listing the archive file in response to a request for a listing of the archive file.

2. The programmable logic controller of claim 1 wherein the instructions further include:
receiving a request for a listing of archive files from a browser application.

3. The programmable logic controller of claim 1 wherein the web page includes a control to open the archive file in a user application.

4. The programmable logic controller of claim 1 wherein the instruction for creating an archive file in a user application format in the file system module includes creating a comma separated values (CSV) mime type formatted file.

5. The programmable logic controller of claim 1 wherein the instruction for converting the binary data to the user application format of the archive file includes converting the binary data to CSV formatted data.

6. A method for operating a programmable logic controller, the method comprising:
collecting and storing a binary data in a memory module of the programmable logic controller;
creating an archive file in a user application format in a persistent file system module of a programmable logic controller, the archive file stored in a persistent storage device of the persistent file system module within the programmable logic controller;
converting the binary data to the user application format of the archive file when a trigger condition for triggering the converting has been satisfied, the trigger condition being a user defined condition for initiating the converting, wherein the collecting and storing of binary data in the memory module continues while converting previously collected and stored binary data; and storing the converted binary data as an entry in the archive file in the persistent file system module; and presenting an archive file system access web page, generated by a web server module, listing the archive file in response to a request for a listing of the archive file.

7. The method of claim 6 further comprising:
receiving a request for a listing of archive files from a browser application.

8. The method of claim 6 wherein present a web page includes present a web page that includes a control to open the archive file in a user application.

9. The method of claim 6 wherein creating an archive file in a user application format in the file system module includes creating a comma separated values (CSV) mime type formatted file.

10. The method of claim 6 wherein converting the binary data to the user application format includes converting the binary data to CSV format data.

11. A programmable logic controller having a web server configured to provide a web page comprising:
a listing of archive files stored in a user application format in a persistent file system module of a programmable logic controller, the archive files stored in a persistent storage device of the persistent file system module within the programmable logic controller, wherein the archive files are generated by converting binary data stored in a memory module of the programmable logic controller to the user application format of the archive files a trigger condition for triggering the converting has been satisfied, the trigger condition being a user defined condition for initiating the converting, wherein the collecting and storing of binary data in the memory module continues while converting previously collected and stored binary data; and
controls adapted to allow a user to open the listed archive files directly into in a user application,
wherein the web page is generated by a web server module in the programmable logic controller coupled to the persistent file system module.

12. The programmable logic controller of claim 11 wherein the user application format is comma separated values mime type format.

13. The programmable logic controller of claim 11 wherein the web page may be displayed on a host computer that includes the programmable logic controller.

14. The programmable logic controller of claim 11 wherein the programmable logic controller from which the listing of archive files is generated includes a controller module and a user program module for storing instructions adapted to be executed by the controller module.

* * * * *